Dec. 18, 1951        A. N. NICHOLSON        2,578,829
REFRIGERATION APPARATUS
Filed Nov. 17, 1950        5 Sheets-Sheet 1

INVENTOR.
Albert N. Nicholson
BY
James C. Hamilton Atty

Dec. 18, 1951  A. N. NICHOLSON  2,578,829
REFRIGERATION APPARATUS
Filed Nov. 17, 1950  5 Sheets-Sheet 2

INVENTOR.
Albert N. Nicholson
BY
James C. Hamilton Atty

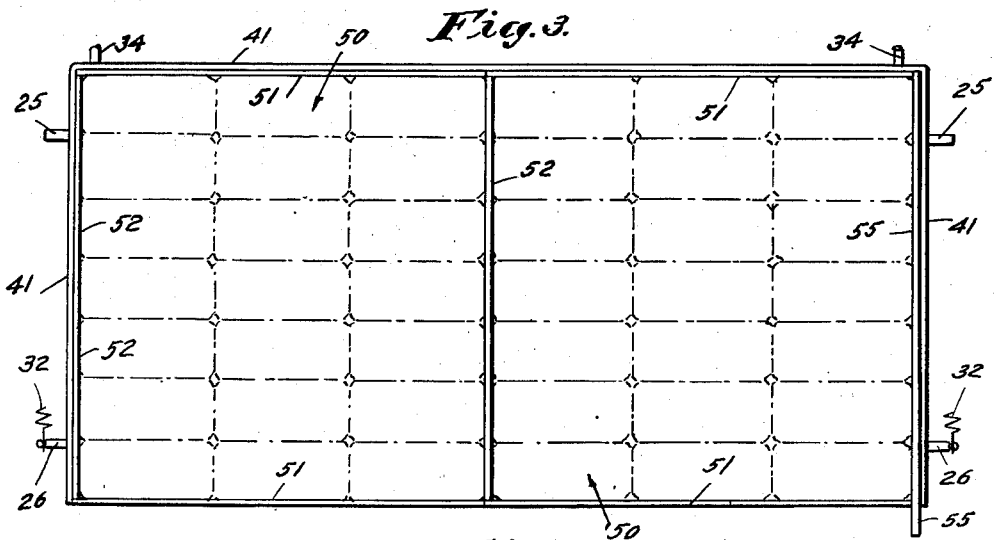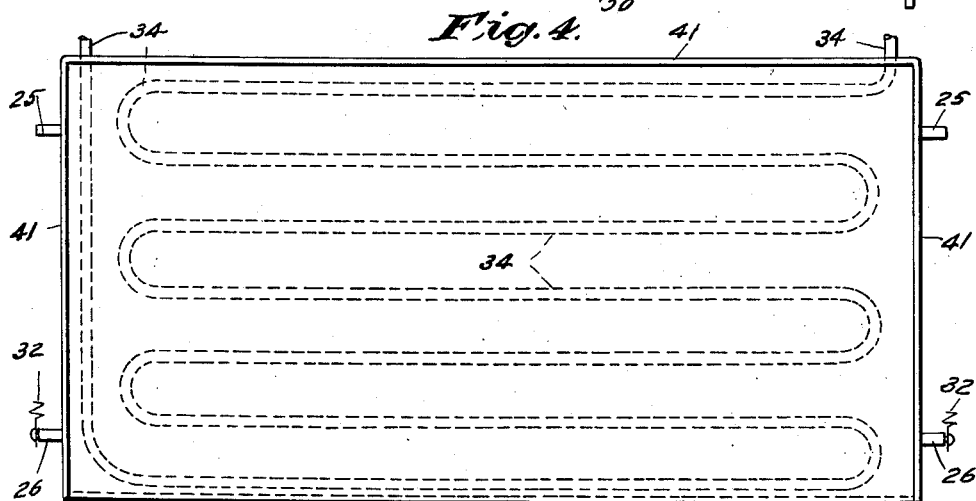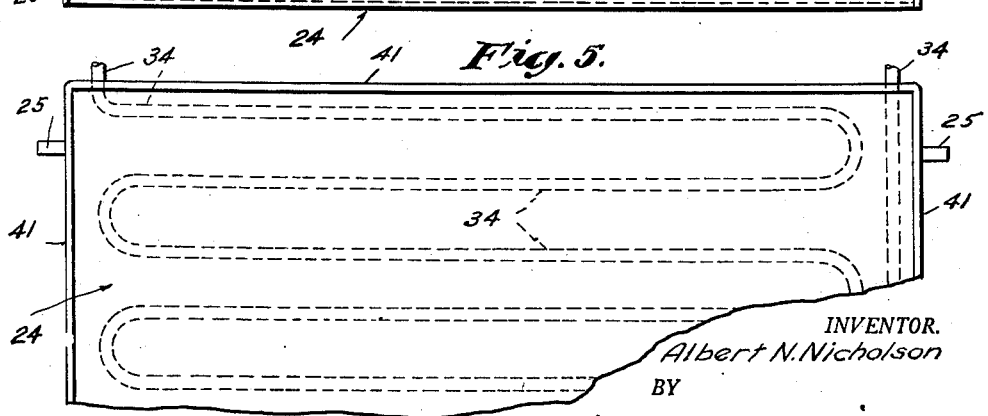

Dec. 18, 1951  A. N. NICHOLSON  2,578,829
REFRIGERATION APPARATUS
Filed Nov. 17, 1950  5 Sheets-Sheet 4
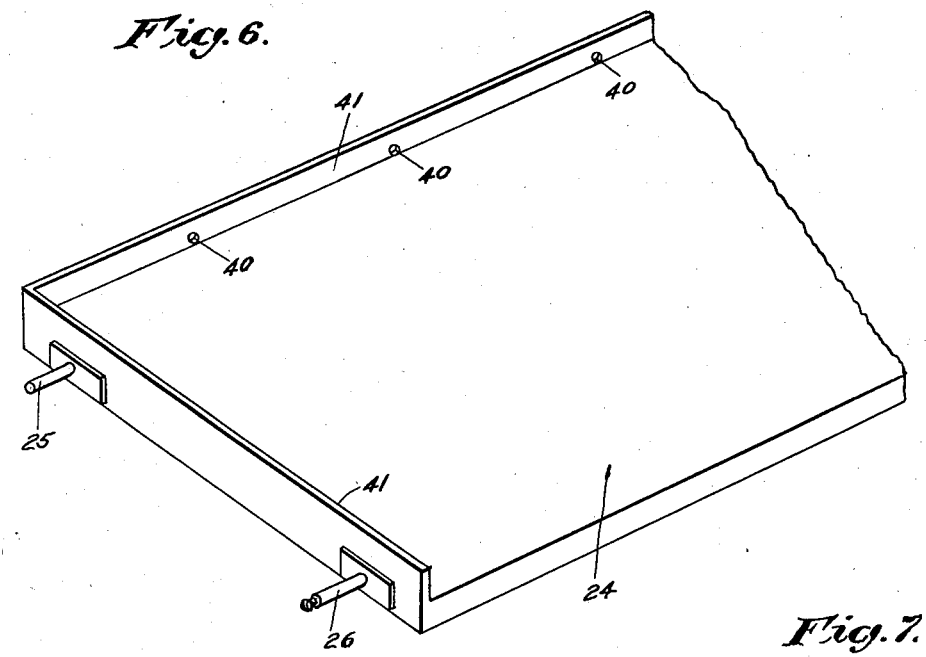
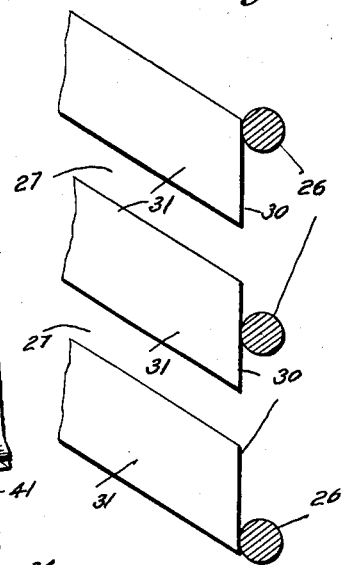
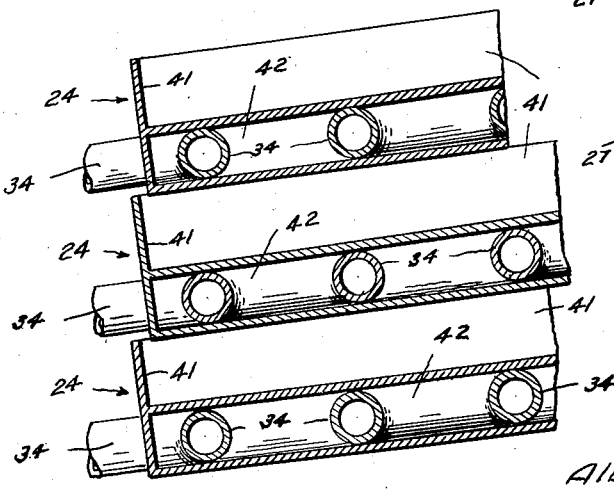
INVENTOR
Albert N. Nicholson
BY
James C. Hamilton Atty.

Dec. 18, 1951  A. N. NICHOLSON  2,578,829
REFRIGERATION APPARATUS
Filed Nov. 17, 1950  5 Sheets-Sheet 5
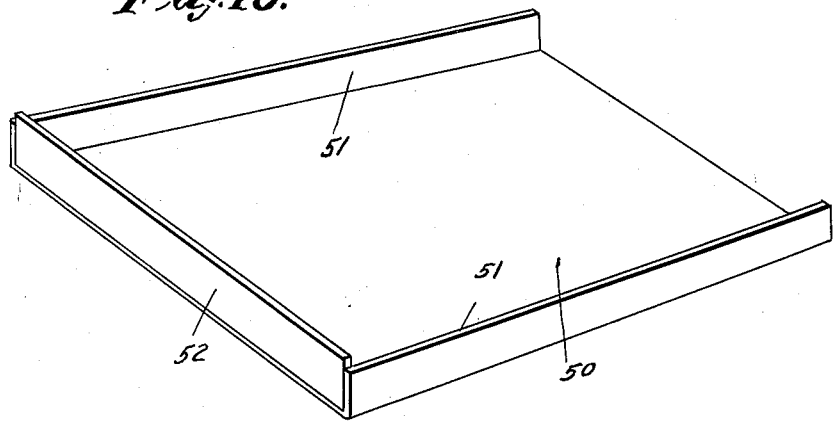
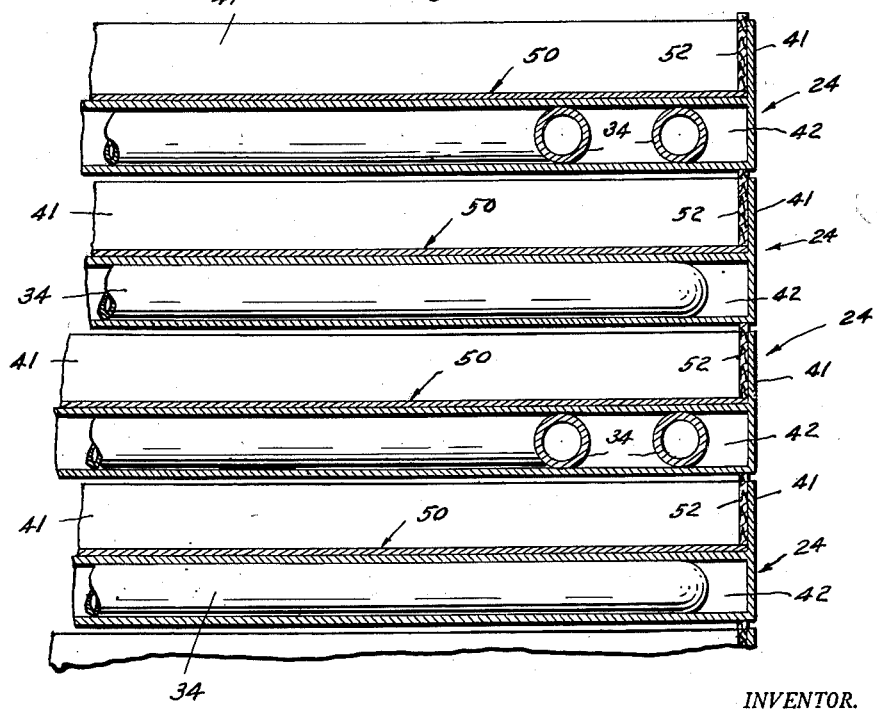
INVENTOR.
Albert N. Nicholson
BY
James C. Hamilton, Atty.

Patented Dec. 18, 1951

2,578,829

UNITED STATES PATENT OFFICE 2,578,829

REFRIGERATION APPARATUS

Albert N. Nicholson, Santa Rosa, Calif., assignor of one-sixth to Joseph W. Rackerby, Jr., one-sixth to Emery R. Lessard, and one-sixth to Joseph C. Bloom, all of Santa Rosa, Calif.

Application November 17, 1950, Serial No. 196,143

2 Claims. (Cl. 62—114)

My present invention relates to refrigeration apparatus and more particularly to refrigeration apparatus for freezing packaged food products such as frozen fish, etc.

In the freezing of packaged food products, such as fish and the like, it is desirable that the apparatus be easily accessible for loading and unloading of small packages and produce a frozen package which is of uniform thickness so that when such packages are stacked up one upon another they will lie flat and not topple over which occurs when the flat sides of the packages are not parallel. Another important requirement is that each package of frozen food must be frozen quickly and uniformly. My improved freezing equipment accomplishes these and other results by unique and efficient means which will be described in the following specification.

The principal object of my invention is to produce a practical and efficient freezing apparatus for packaged food products.

Another object is to produce an apparatus as above stated, in which the packaged food product may be loaded on trays which may be inserted on movable freezing plates, each plate being moved into loading position instantly as needed, starting from the lowermost plate and working upwardly in a vertical stack until the freezer is fully loaded, after which an upper freezing plate, which is attached to hydraulic means, is lowered and hydraulic pressure is applied to the entire stack of plates during the freezing period, thus providing for the uniform and parallel surfaces of the packages.

Another object is to accomplish the results above described and at the same time provide for expansion of the stacked plates due to the expansion of the food products when freezing occurs.

Still another object is to provide means for separating an upper plate from a lower plate which is being loaded or unloaded, thereby providing handling space between plates during such loading operations, such handling space being provided in successive progression from top to bottom or reverse.

Other objects and novel features comprising the construction and operation of the invention which make the above features possible will be described more in detail as the description of the apparatus progresses.

In the drawings illustrating the preferred embodiment of the invention:

Fig. 3 is a plan view of one of the freezing plates and trays assembled, the dot-and-dash lines indicating packaged food products as assembled on the trays;

Fig. 4 is a plan view of the freezing plate shown in Fig. 3 but with the trays removed and more particularly showing in dotted lines a refrigerant coil which is located internally of said plate;

Fig. 5 is a fragmentary plan view of a freezing plate similar to Fig. 4, but showing the refrigerant coil in the plate reversed in position;

Fig. 6 is a fragmentary perspective view of one of the freezing plates;

Fig. 7 is a diagrammatic view of one of the slotted guide plates more specifically referred to further along in the specification;

Fig. 8 is a fragmentary typical cross-section of the rear portion of the freezing plates when unloaded and in a raised position;

Fig. 9 is a fragmentary typical cross-section of the frozen portion of the freezing plates when in a loaded position but not loaded with food packages, and Fig. 10 is a perspective view of one of the loading trays upon which the packaged food is placed.

Figure 1:
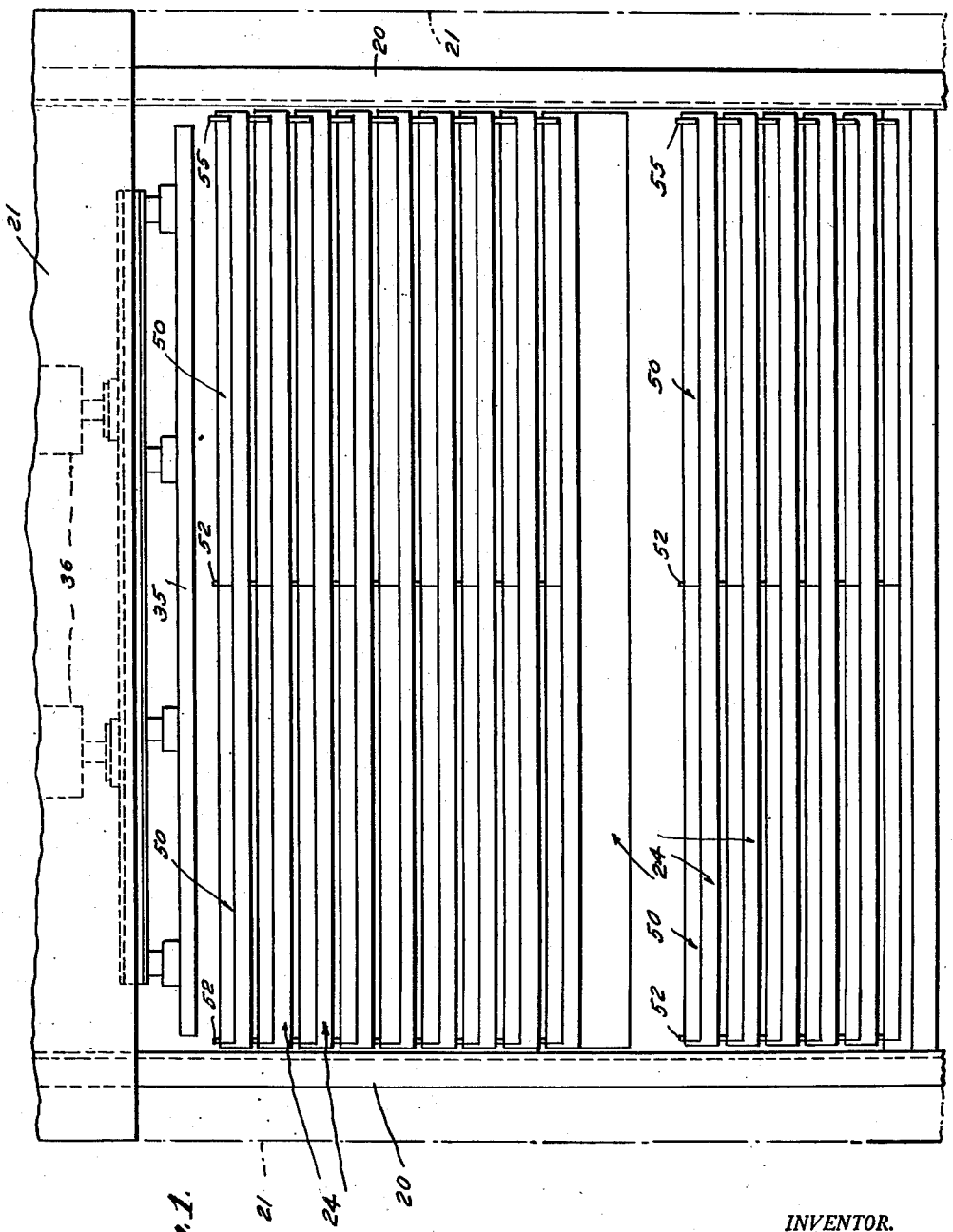
Fig. 1 is fragmentary front elevation, a portion of the insulation of the outer case being removed to better show the internal apparatus.

Referring more in detail to the drawings, 20 indicates a superstructure frame which supports the various parts of the freezer and to which the outer insulation of the freezer is attached, etc., as indicated at 21.

Attached in any suitable manner to the frames 20 are slotted plates 22 and 23. These slotted plates are duplicated on the far side of the apparatus from that shown in Fig. 2. The plate 22 is the front plate and the plate 23 is the rear plate.

The freezing plates are generally indicated by the numeral 24. These freezing plates are identical with one exception. This exception is illustrated in Figs. 4 and 5 and is concerned with the position of the refrigerant coils 34. These refrigerant coils are identical but are alternated with respect to their position in the freezing plates 24. By alternation of the position of the coils in plates contacting each other freezing temperatures in the plates are kept uniform throughout the stack. In so far as the plates are concerned they are interchangeable.

The packaged food is usually packed in a waxed or similar prepared paper which has very little affinity for sticking to the bottom of the plates or the trays. Both the trays and plates are preferably made from polished stainless steel.

The sides of the freezing plates 24 are provided with pins 25 and 26. The front pins 26 are slidable in the inclined slots 26 of the slotted plates 22. These inclined slots 27 are uniform in shape, angle and spacing. The pins 25 are slidably mounted in the inclined slots 28 in the slotted plates 23. The lower front portion of the slots 28 are not uniform in depth. The depth portion of the front end of the slots 28 are progressively deeper with the maximum depth at the top of the group. The lower face of the slots 28 are curved at the lower front portion and join the depressed back sides of the slots 28 to form cam surfaces 29. The depressed front portion of the slots 28 are provided to compensate for the expansion between the freezing plates 24 when the food products expand during the freezing operation. The freezing plates cannot expand downwardly and therefore expand upwardly averaging approximately one-sixteenth of one inch between plates.

The front slotted plates 22 having the slots 27 not only provide the open ended inclined slots 27 to guide the pins 26 but also provide a vertical face 30 formed on the finger 31, which separates the slots 27, against which the pins 26 bear. Attached to the pins 26 are tension springs 32. The springs 32 are anchored on their rear ends to the frame 20, the rear anchor ends being higher than the front ends, thereby locating the springs at an angle, as indicated in dot-and-dash lines in Fig. 2.

Figure 2:
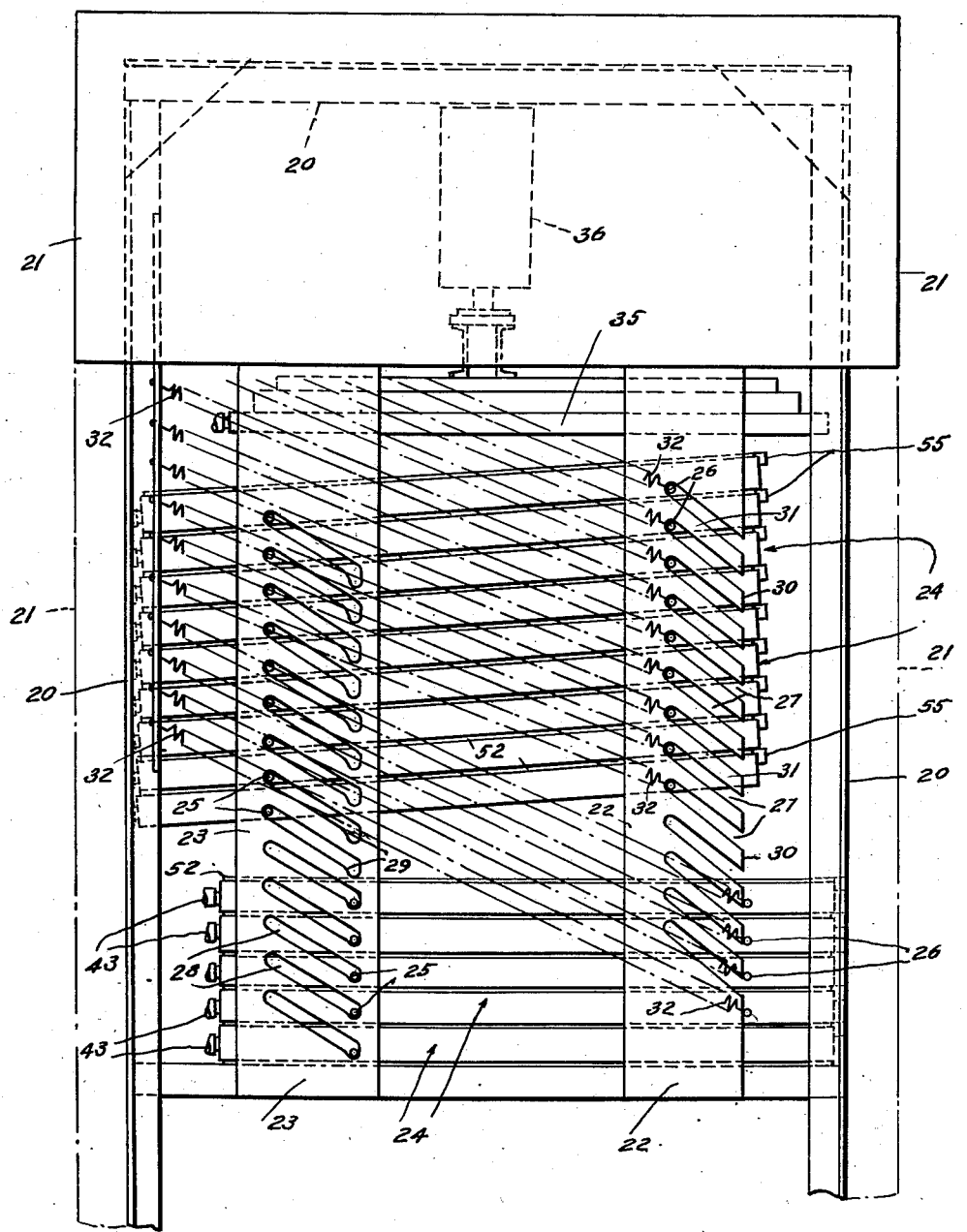
Fig. 2 is a fragmentary side elevation with a portion of the outer case insulation removed and particularly showing the freezing plates in the position of loading or unloading.

When the freezing plates 24 are in a loading position, as shown in the lower portion of Fig. 2, the pins 26 are engaged against the vertical faces 30 of the fingers 31 of the slotted plates 22 and the pins 25 on the rear portions of the freezing plates are in the depressed areas of the slots 28 in the plates 23.

The freezing plates 24 are loaded from the bottom. As each plate is loaded the next upper plate is pulled forward on the slots of the plates 22 and 23 into the position shown in the lower portion of Fig. 2 until the entire stack of plates have been loaded. The top plate 35 which is fitted with a refrigerant coil similar to coil 34 in the loaded stack plates is now brought down into contact with the top plate by means of hydraulic pistons 36 located in the top of the apparatus and pressure is applied to the stock. At the same time refrigerant fluid is passed through the coils freezing the packaged food in the trays on the plates. The pressure exerted by the hydraulic pistons smooth out and flatten the top and bottom sides of the packaged food so that the top and bottom sides are parallel.

During the period of time during the freezing of the food, vertical expansion between the freezing plates 24 takes place forcing the plates slightly apart. When this expansion takes place the pins 25 and 26 rise slightly. The rear pins 25 rise in the depressed areas of the slots 28 in plates 23 and the front pins 26 slide up on the front vertical faces 30 of the slot fingers 31. Fig. 7 illustrates the movement of the pins 26. In Fig. 7 the lowermost pin 26 shows an approximate position with respect to the lowermost finger face 30. The uppermost pin 26 in this figure indicates the approximate position of the top freezing tray pin 26 directly under the freezing plate 35. The middle pin 26 in the same figure indicates the approximate position midway between the top and bottom freezing plates of the stack.

When it is desired to unload the frozen food the pressure is released and the top plate 35 is raised to a position approximating that shown in Fig. 2. The freezing plates 24 are at this time all forward and in a horizontal position, as shown in the lowermost portion of Fig. 2. The top plate 24 is now unloaded and raised at the front until the pin 26 enters the slot 27, at which time the spring 32 now under tension counterbalances the plate 24, making it easy to slide the plate upwardly and rearwardly. Each plate is unloaded and raised in the same way until all of the plates have been unloaded.

In Fig. 2 it will be noted that the raised plates are pitched rearwardly. The reason for this is to provide drainage for moisture which may be present in the form of light front on the plates 24. By viewing Fig. 6, it will be noted that drain holes 40 are provided in the rear side 41 of the plate 24 for this purpose.

When the apparatus is loaded the lowermost plate 24 is first loaded and then the next above plate is pulled forward and down on the stack and the procedure is repeated until the entire stack is loaded.

The freezing plates generally indicated by the numeral 24 comprise a bottom compartment 42 which is closed on all sides. This compartment 42 contains the refrigerant coil 34. The refrigerant coils 34 are connected by means of rubber hose 43 to any suitable refrigeration compressor, etc., not shown but well known in the art and does not comprise a part of the invention being old and well known in all refrigeration apparatus. The hydraulic power in the cylinders 36 are supplied from the same or similar well known apparatus. The back and two opposite sides of the freezing plates 24 are provided with an upper flange 40. The packaged food indicated in dot-and-dash lines in Fig. 3 are packed in trays 50 better shown in Fig. 10. These trays 50 are provided with side flanges 51, and a wooden strip 52, the top of which extends slightly above the top of the flanges 5. If desired the flange 51, 51 may also extend around the outside of the wood strip 52; the top edge being the same height as the two parallel front and back sides. Fig. 3 shows the method of placing the trays 50 on the freezing plates 24. The first tray is placed to the left-hand side of the plate 24 so that the open end is on the right. The second tray is now placed on the freezing plate 24 with the wooden strip against the open end of the first tray. Now a third free wooden strip 55 is inserted down between the open end of the second tray and against the side flange 41 of the plate 24. It will be noted in the drawings that the free wooden strip indicated at 55 extends out beyond the front edge of the freezing plate 24 presenting an overhanging end.

When the freezing plates are loaded with the trays 50 the bottom of the upper plate 24 rests on the upper edges of the three wooden strips 52, 52 and 55. When unloading the freezer the first operation is to take hold of the extended end of the strip 55 and lift it out of the machine. This breaks up the assembly so that the trays 50 which may have a little frost on them may be slid off of the plates and the contents slid off of the trays to any desired receptacle or conveyor belt for further handling.

When raising an unloaded plate the rear side of the plate pivots on the rear ends of the wooden trips 52, 52 and 55 before moving upwardly and rearwardly which prevents scuffing of the packaged frozen food. This movement is made possible by the depressed areas in the rear slots 28. As the pins 26 enter the slots 27 between the fingers 31 the rear pins 25 ride up on the cam surfaces 29 of the slots 28. The reverse is true when loading the plates.

From the foregoing description it will be seen that I have developed a novel and efficient freezing apparatus for packaged foods and it is to be understood that I may vary the size and proportion and use equivalent structure within wide latitude while still remaining within the spirit of the appended claims.

Having thus described my invention what I claim as new is:

1. In a freezer for freezing packaged food products, the said freezer having vertically stacked freezer plates movably mounted in fixed frames, means for vertically raising one entire plate at a time away from the next lower plate and then moving it diagonally and upwardly and rearwardly in parallel relation to the next lower plate, said means comprising pins located adjacent the four corners of said plate, tension springs engaging said pins on the front corners of said plates, the rear end of said springs being anchored to said frames at a point above the rear corners of said plate, diagonally located slots located in said frames, said pins engaging in said slots, means for permitting vertical upward movement of said plate and preventing diagonal upward movement.

2. In a freezer as set forth in claim 1 in which said means for permitting vertical upward movement of said plate and preventing diagonal movement comprises finger members formed between the open ends of adjacent slots, the ends of said fingers being vertically faced, the front pins of said plate being engaged against the said vertical face of said finger.

ALBERT N. NICHOLSON.

REFERENCES CITED

The following references are of record in the file of this patent:

UNITED STATES PATENTS

| Number | Name | Date |
|---|---|---|
| 1,924,225 | Yamane | Aug. 29, 1933 |
| 2,232,383 | Greig | Feb. 18, 1941 |
| 2,280,133 | Sundbach | Apr. 21, 1942 |
| 2,283,923 | Hall | May 26, 1942 |
| 2,315,768 | Burnette | Apr. 6, 1943 |
| 2,329,746 | Davison | Sept. 21, 1943 |
| 2,455,867 | Kleist | Dec. 7, 1948 |
| 2,485,509 | Raye | Oct. 18, 1949 |
| 2,487,584 | Patterson | Nov. 8, 1949 |
| 2,531,210 | Gilson | Nov. 21, 1950 |